(12) United States Patent
Doi (10) Patent No.: US 7,270,699 B2
(45) Date of Patent: Sep. 18, 2007

(54) INK SET FOR INK-JET RECORDING, INK-JET RECORDING METHOD AND INK-JET RECORDING APPARATUS

(75) Inventor: Takatsugu Doi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 118 days.

(21) Appl. No.: 10/930,866

(22) Filed: Sep. 1, 2004

(65) Prior Publication Data

US 2005/0166792 A1 Aug. 4, 2005

(30) Foreign Application Priority Data

Feb. 4, 2004 (JP) .............................. 2004-027678

(51) Int. Cl.
*C09D 11/02* (2006.01)
*B41J 2/01* (2006.01)

(52) U.S. Cl. ............... 106/31.27; 106/31.6; 106/31.58; 106/31.86; 106/31.46; 106/31.47; 106/31.49; 106/31.76; 106/31.77; 106/31.78; 106/31.87; 106/31.33; 106/31.65; 347/100

(58) Field of Classification Search ............ 106/31.27, 106/31.6, 31.58, 31.86, 31.46, 31.47, 31.49, 106/31.76, 31.77, 31.78, 31.87, 31.33, 31.65; 347/100
See application file for complete search history.

(56) References Cited

U.S. PATENT DOCUMENTS 4,325,735 A * 4/1982 Ohta et al. ............... 106/31.49
5,198,023 A * 3/1993 Stoffel ...................... 106/31.32
5,320,668 A * 6/1994 Shields et al. ............ 106/31.26
5,518,534 A * 5/1996 Pearlstine et al. ........ 106/31.75
5,536,306 A * 7/1996 Johnson et al. .......... 106/31.49

(Continued)

FOREIGN PATENT DOCUMENTS

JP      A 63-265681      11/1988

(Continued)

OTHER PUBLICATIONS

English translation of JP 2001/294788, Oct. 2001.*

*Primary Examiner*—Helene Klemanski
(74) *Attorney, Agent, or Firm*—Oliff & Berridge, PLC (57) ABSTRACT

The invention provides an ink set for ink-jet recording that is able to form an image having a sufficient optical density and causing no feathering and intercolor bleed within a short period of time while being excellent in reliability of the maintenance unit. The ink set comprises at least a liquid (a) containing a colorant, water soluble solvent and water; a liquid (b) containing a pH adjusting agent, water soluble solvent and water; and a liquid (c). The ink set satisfies any one of the conditions in the first embodiment: (i) the colorant is anionic, (ii) the liquid (b) has a pH of not higher than 6.5, (iii) the liquid (c) has a pH of not lower than 8.0, and (iv) the mixed liquid of the liquid (b) and the liquid (c) in a mass ratio of 1:1 has a pH of not lower than 7; or the second embodiment: (i) the colorant is cationic, (ii) the liquid (b) has a pH of not lower than 8.5, (iii) the liquid (c) has a pH of not higher than 6.0, and (iv) the mixed liquid of the liquid (b) and the liquid (c) in a mass ratio of 1:1 has a pH of not higher than 7.

26 Claims, 5 Drawing Sheets

U.S. PATENT DOCUMENTS

| | | | |
|---|---|---|---|
| 5,555,008 A * | 9/1996 | Stoffel et al. | 347/100 |
| 5,679,143 A | 10/1997 | Looman | 106/31.43 |
| 5,976,231 A | 11/1999 | Schwarz | |
| 6,022,908 A * | 2/2000 | Ma et al. | 523/160 |
| 6,048,388 A | 4/2000 | Schwarz | |
| 6,367,923 B1 | 4/2002 | Koitabashi | |
| 6,573,405 B1 | 6/2003 | Abbott et al. | |
| 7,018,452 B2 * | 3/2006 | Yamashita et al. | 106/31.27 |
| 2004/0035293 A1 | 2/2004 | Davis, Jr. | |
| 2004/0207703 A1 * | 10/2004 | Doi | 347/100 |
| 2004/0244645 A1 * | 12/2004 | Doi et al. | 106/31.58 |
| 2004/0257418 A1 * | 12/2004 | Doi | 106/31.27 |
| 2005/0183628 A1 | 8/2005 | Lehmann et al. | |
| 2005/0264630 A1 * | 12/2005 | Doi | 347/100 |
| 2006/0023042 A1 * | 2/2006 | Doi | 347/100 |
| 2006/0066661 A1 * | 3/2006 | Yamashita et al. | 347/21 |
| 2006/0139426 A1 * | 6/2006 | Doi | 347/100 |
| 2006/0203055 A1 | 9/2006 | Doi | |

FOREIGN PATENT DOCUMENTS

| | | |
|---|---|---|
| JP | A 08-072233 | 3/1996 |
| JP | B2 2667401 | 6/1997 |
| JP | A 09-176531 | 7/1997 |
| JP | B2 2711888 | 10/1997 |
| JP | B2 3033069 | 2/2000 |
| JP | A 2000-109735 | 4/2000 |
| JP | A 2001-294788 | 10/2001 |
| JP | A 2004-339346 | 12/2004 |

* cited by examiner

INK SET FOR INK-JET RECORDING, INK-JET RECORDING METHOD AND INK-JET RECORDING APPARATUS

CROSS-REFERENCE TO RELATED APPLICATION

This application claims priority under 35 USC 119 from Japanese Patent Application No. 2004-27678, the disclosure of which is incorporated by reference herein.

BACKGROUND OF THE INVENTION

1. Field of the Invention

The present invention relates to an ink set for ink-jet recording, an ink-jet recording method and an ink-jet recording apparatus.

2. Description of the Related Art

An ink-jet recording method for ejecting a liquid or molten solid ink from an ink-ejection port such as a nozzle, slit or porous film has been used for many printers since the apparatus used for this method is small in size and inexpensive. A piezoelectric ink-jet recording method for ejecting the ink by taking advantage of deformation of a piezoelectric element or a thermal ink-jet recording method taking advantage of boiling of the ink by thermal energy have been often utilized among various ink-jet recording methods from the view point of high resolution and high printing speed. Further, an ink-jet printer is able to print not only on paper sheets such as plain paper and ink-jet printing paper, but also on films such as OHP sheets and clothes.

High speed printing and high image quality are important issues in the technical field of ink-jet printers at present. Japanese Patent No. 2,667,401 proposes an image forming method for satisfying high speed printing and high image quality together by allowing a liquid (c)ontaining a cationic group-bearing compound to adhere on a recording medium, followed by allowing an ink containing an anionic dye to adhere immediately after the liquid permeates into and remains in the recording medium.

U.S. Pat. No. 5,679,143 proposes an ink set comprising a first ink and a second ink having different pH values from each other for preventing bleeding between the two inks by allowing the ink components to coagulate when the first ink contacts the second ink.

However, in the above methods when the first ink and the second ink are stored in a common maintenance unit, these are cases where the inks are coagulated in the maintenance unit and reliability of the maintenance unit cannot be ensured.

Therefore, it has not been possible to satisfy optical density, feathering, intercolor bleeding, drying time and reliability of the maintenance unit at the same time by the conventional methods.

SUMMARY OF THE INVENTION

The present invention has been made in view of the above circumstances and provides an ink set for ink-jet recording, an ink set for ink-jet recording method and a an ink set for ink-jet recording apparatus that according to which optical density of formed image is high, feathering and intercolor bleeding are suppressed, drying time is short, and reliability of s maintenance unit is high.

The present inventors have concluded, through intensive studies, that optical density of images, feathering, intercolor bleeding, drying time and reliability of the maintenance unit are simultaneously satisfied by satisfying the claims of the invention.

In a first aspect, the invention provides an ink set for ink-jet recording comprising at least a liquid (a) containing at least a colorant, water soluble solvent and water, a liquid (b) containing at least a pH adjusting agent, water soluble solvent and water, and a liquid (c). The ink set of the first aspect satisfies the following conditions:
(i) the colorant is anionic;
(ii) the liquid (b) has a pH of not higher than 6.5;
(iii) the liquid (c) has a pH of not lower than 8.0; and
(iv) a mixed liquid of the liquid (b) and the liquid (c) in a mass ratio of 1:1 has a pH of not lower than 7.

In a second aspect, the invention provides an ink set for ink-jet recording comprising at least a liquid (a) containing at least a colorant, water soluble solvent and water, a liquid (b) containing at least a pH adjusting agent, water soluble solvent and water, and a liquid (c): The ink set of the second aspect satisfies the following conditions:
(i) the colorant is cationic;
(ii) the liquid (b) has a pH of not lower than 8.5;
(iii) the liquid (c) has a pH of not higher than 6.0; and
(iv) a mixed liquid of the liquid (b) and the liquid (c) in a mass ratio of 1:1 has a pH of not higher than 7.

Preferably, the liquid (b) contains a heterocyclic compound represented by the following general formula in the first aspect of the invention, i.e. when an anionic compound is used as the colorant.; (I)

In the formula (I), X represents any one of O, NH, NR S or $SO_2$, R represents an alkyl group, n represents an integer from 3 to 6, and m represents an integer from 0 to 7.

Preferable aspects of the ink set for ink-jet recording of the invention are described below. These aspects are favorable for both the first aspect (in which the colorant is anionic) and the second aspect (in which the colorant is cationic).

Preferably, the number of coarse particles with a diameter of no less than 5 μm contained in a mixed liquid of the liquid (a) and the liquid (b) in a mass ratio of 1:1 is no less than 1000 particles/μL, and the number of coarse particles with a diameter of no less than 5 μm contained in a mixed liquid of the liquid (a), the liquid (b) and the liquid (c) in a mass ratio of 1:1:1 is not larger than 1000 particles/μL in the ink set of the invention.

Preferably, the colorant in the liquid (a) is a pigment, and the pigment is at least one pigment selected from a pigment dispersed with a polymer dispersant, a self-dispersible pigment, and a pigment coated with a resin.

Preferably, a mixed liquid of the liquid (a), liquid (b) and the liquid (c) in a mass ratio of 1:1:1 has a conductivity of not larger than 5.0 S/m.

The liquid (b) and/or the liquid (c) may contain a colorant.

Preferably, the liquid (a) have a surface tension of no less than 15 mN/m and not larger than 60 mN/m.

Preferably, the liquid (b) and the liquid (c) each have a surface tension of no less than 15 mN/m and not larger than 45 mN/m.

Preferably, the liquid (a), liquid (b) and the liquid (c) each have a viscosity of no less than 1.2 mPa·s and not larger than 8.0 mPa·s.

The invention also provides an ink-jet recording apparatus comprising a recording head for ejecting each liquid in a ink set for ink-jet recording and using the ink set for ink-jet recording of the invention.

Preferable aspects of the ink-jet recording apparatus of the invention are described below.

Preferably, the ink-jet recording apparatus of the invention comprises a maintenance unit in which at least three kinds of liquids including at least the liquid (a), liquid (b) and the liquid (c) are mixed.

Preferably, the ink-jet recording apparatus comprises a maintenance mechanism for keeping the pH of the liquid in the maintenance unit at 5 to 9.

Preferably, the pH of the liquid filled in the maintenance unit is kept at 5 to 9.

Preferably, the ink-jet recording apparatus comprises a maintenance mechanism for keeping the conductivity of the liquid (a)t not higher than 5.0 S/m.

Preferably, the conductivity of the liquid filled in the maintenance unit is kept at not higher than 5.0 S/m.

Preferably, the at least three kinds of the liquids are used to carry out printing by a thermal ink-jet method or piezoelectric ink-jet method.

Preferably, the at least three kinds of liquids are applied on a recording medium in an amount of not larger than 25 ng per one drop.

The invention also provides an ink-jet recording method for recording by ejecting each liquid in the ink set for ink-jet recording on a recording medium using the ink set for ink-jet recording according to the first or liquid (b) aspect of the invention. When a liquid (b) or liquid (c) contains the colorant in the ink-jet recording method for recording by ejecting each liquid in the ink set for ink-jet recording on a recording medium, the ink set contains a heterocyclic compound.

Preferably, an image is formed by applying the liquid (c) onto the recording medium after applying the liquid (a) and the liquid (b) onto the recording medium so that the liquid (a) and the liquid (b) contact one another in the ink-jet recording method of the invention.

The ink set for ink-jet recording of the invention exerts such effects as high optical density of formed image, suppression of feathering and intercolor bleeding, short drying time and excellent reliability of the maintenance unit. The ink-jet recording method and ink-jet recording apparatus of the invention enable an excellent image having a high optical density and suppressed feathering and intercolor bleeding to be formed with a short drying time while reliability of the maintenance unit is excellent.

BRIEF DESCRIPTION OF THE DRAWINGS

Preferred embodiments of the resent invention will be described in detail based on the following figures, wherein.

DESCRIPTION OF THE PREFERRED EMBODIMENTS

An ink set for ink-jet recording of the present invention comprises at least three kind of liquids including (1) a liquid (a) containing a colorant, a water soluble solvent and water, (2) a liquid (b) containing a pH adjusting agent, a water soluble solvent and water, and (3) a pH adjusting agent, a water soluble solvent and water. The ink set may comprise at least four liquids.

The materials used for each liquid (c)onstituting the ink set for ink-jet recording will be sequentially described below.

(Colorant)

While both a pigment and a dye can be used as the colorant of the invention, the colorant contained in the liquid (a) is preferably a dye from the view point of high image density after coagulation.

Both organic pigments and inorganic pigments can be used as the pigment used in the invention. Examples of black pigments include carbon black pigments such as furnace black, lamp black, acetylene black and channel black. Examples of the hue of the pigment include black and the three primary color pigments of cyan, magenta and yellow as well as pigments of specified colors such as red, green, blue, brown and white; metallic luster pigments such as gold and silver; colorless or pale color extender pigments; and plastic pigments. Novel pigments synthesized for the invention may be also used.

Specific examples of the black pigment include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080 and Raven 1060 (manufactured by Columbia Carbon Co.); Regal 1400R, Regal 1330R, Regal 1660R, Mogul L, Black Pearls L, Monarch 700, Monarch 800, Monarch 880, Monarch 900, Monarch 1000, Monarch 1100, Monarch 1300 and Monarch 1400 (manufactured by Cabot Co.); Color Black FW1, Color Black FW2, Color Black FWV2, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Co.); and No. 25, No. 33, No. 40, No. 47, No. 52, No. 900 and No. 2300, MCF-88, MA 600, MA 7, MA 8 and MA 100 (manufactured by Mitsubishi Chemical Co.). However, the pigment is not restricted thereto.

While specific examples of the cyan pigment include C.I. Pigment Blue-1, -2, -3, -15, -15:1, -15:2, -15:3, -15:4, -16, -22 and -60, the pigment is not restricted thereto.

While specific examples of the magenta pigment include C.I. Pigment Red-5, -7, 12, -48, -48:1, -57, -112, -122, -123, -146, -168, -184 and -202, the pigment is not restricted thereto.

While specific examples of the yellow pigment include such as C.I. Pigment Yelllow-1, -2, -3, -12, -13, -14, -16, -17, -73, -74, -75, -83, -93, -95, -97, -98, -114, -128, -129, -138, -151, -154 and -180, the pigment is not restricted thereto.

Pigments that are self-dispersible in water (self-dispersible pigments) may be used in the invention. The water self-dispersible pigment refers to a pigment having many water solubilizing groups on the surface of the pigment, and being stably dispersible in water even in the absence of a polymer dispersant. For example, so-called pigments are subjected to surface modification treatments such as acid or base treatment, coupling agent treatment, polymer graft treatment, plasma treatment and oxidation/reduction treatment. The water auto-dispersible pigment is obtained by applying such treatment to conventional pigments.

Examples of the self-dispersible pigment available include the pigment obtained by applying the surface modification treatment to conventional pigments as well as commercially available self-dispersible pigments such as Cab-o-jet-200, Cab-o-jet-250, Cab-o-jet-260, Cab-o-jet-270, Cab-o-jet-300, IJX-444 and IJX-56 manufactured by Cabot Co., and Microjet Black CW-1, CW-2 and CW-3 manufactured by Orient Chemical Co.

A polymer may be added in liquid when the self-dispersible pigment is used as the pigment.

Pigments coated with a resin may be used as the colorant. Such a pigment is called a micro-capsule pigment, and those manufactured by Dainippon Ink & Chemicals Inc. and Toyo Ink Manufacturing Co. may be used. However, the pigment is not restricted thereto, and micro-capsule pigments experimentally manufactured for the invention may be also used.

The dye used in the invention may be any of water-soluble dyes and disperse dyes.

Specific examples of the water-soluble dye include C.I. Direct Black-2, -4, -9, -11, -17, -19, -22, -32, -80, -151, -154, -168, -171, -194 and -195, C.I. Direct Blue-1, -2, -6, -8, -22, -34, -70, -71, -76, -78, -86, -112, -142, -165, -199, -200, -201, -202, -203, -207, -218, -236, -287 and -307, C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189 and -227, C.I. Direct Yellow-1, -2, -4, -8, -11, -12, -26, -27, -28, -33, -34, -41, -44, -48, -58, -86, -87, -88, -132, -135, -142, -144 and -173, C.I. Food Black-1 and -2, C.I. Acid Black-1, -2, -7, -16, -24, -26, -28, -31, -48, -52, -63, -107, -112, -118, -119, -121, -156, -172, -194 and -208, C.I. Acid Blue-1, -7, -9, -15, -22, -23, -27, -29, -40, -43, -55, -59, -62, -78, -80, -81, -83, -90, -102, -104, -111, -185, -249 and -254, C.I. Acid Red-1, -4, -8, -13, -14, -15, -18, -21, -26, -35, -37, -52, -110, -144, -180, -249, -257 and -289, and C.I. Acid Yellow-1, -3, -4, -7, -11, -12, -13, -14, -18, -19, -23, -25, -34, -38, -41, -42, -44, -53, -55, -61, -71, -76, -78, -79 and -122.

Specific examples of the disperse dye include C.I. Disperse Yellow-3, -5, -7, -8, -42, -54, -64, -79, -82, -83, -93, -100, -119, -122, -126, -160, -184:1, -186, -198, -204 and -244, C.I. Disperse Orange-13, -29, -31:1, -33, -49, -54, -66, -73, -119 and -163, C.I. Disperse Red-1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356 and -362, C.I. Disperse Violet-33, C.I. Disperse Blue-14, -26, -56, -60, -73, -87, -128, -143, -154, -165, -165:1, -176, -183, -185, -201, -214, -224, -257, -287, -354, -365 and -368, and C.I. Disperse Green-6:1 and -9.

Among the liquid (a) of the liquids used for the ink set for ink-jet recording of the invention, the liquid (a) is required to contain the colorant. It is preferable for attaining a sufficient optical density and from the view point of stability of ejection characteristics that the colorant used in the invention accounts for no less than 0.5% by mass and no greater than 20% by mass relative to the liquid (a) based on solid content conversion, and the pigment is more preferably used in a range of no less than 1% by mass and no greater than 10% by mass.

(Additives Used Together with Colorant)

The invention, a polymer dispersant for dispersing the pigment may be contained the liquid. A polymer compound may be added as the polymer dispersant or as a pH sensitive resin for accelerating coagulation of the self-dispersible pigment. Nonionic, anionic, cationic and amphoteric compounds may be used as the polymer compound, and foe example, a copolymer of monomers having $\alpha,\beta$-ethylenic unsaturated groups. The copolymer may be any of random, block and graft copolymers.

Examples of monomers having $\alpha,\beta$-ethylenic unsaturated groups serving as a constituent of anionic polymer compounds include acrylic acid, methacrylic acid, crotonic acid, itaconic acid, itaconic acid monoesters, maleic acid, maleic acid monoesters, fumaric acid, fumaric acid monoesters, vinylsulfonic acid, styrenesulfonic acid, sulfonated vinylnaphthalene, vinyl alcohol, acrylamide, methacryloxyethyl phosphate, bismethacryloxyethyl phosphate, methacryloxyethylphenyl acid phosphate, ethyleneglycol dimethacrylate, diethyleneglycol dimethacrylate, styrene, styrne derivatives such as $\alpha$-methyl styrene and vinyltoluene, vinylcyclohexane, vinylnaphthalene, vinylnaphthanele derivatives, alkyl acrylate esters, phenyl acrylate esters, alkyl methacrylate esters, phenyl methacrylate esters, cycloalkyl methacrylate esters, alkyl crotonate esters, dialkyl itaconate esters and dialkyl maleate esters.

Homopolymers of monomers having $\alpha,\beta$-ethylenic unsaturated groups, or copolymers obtained by copolymerization of plural monomers are used as the polymer compound contained in the liquid together with the colorant. Examples of such polymer compound include styrene-styrene sulfonic acid copolymers, styrene-maleic acid copolymers, styrene-methacrylic acid copolymers, styrene-acrylic acid copolymers, vinylnaphthalene-maleic acid copolymers, vinylnaphthalene-methacrylic acid copolymers, vinylnaphthalene-acrylic acid copolymers, alkyl acrylate ester-acrylic acid copolymers, alkyl methacrylate ester-methacrylic acid copolymers, styrene-alkyl methacrylate-methacrylic acid copolymers, styrene-alkyl acrylate ester-acrylic acid copolymers, styrene-phenyl methacrylate ester-methacrylic acid copolymers, and styrene-cyclohexyl methacrylate esiter-methacrylic acid copolymers.

Examples of the nonionic compound include polyoxyethylene alkylene alkyl ether and polyoxyethylene alkylphenyl ether.

Examples of the cationic polymer dispersant include copolymers of N,N-dimethylaminoethyl methacrylate, N,N-dimethylaminoethyl acrylate, N,N-dimethylamino methacrylamide, N,N-dimethylamino acrylamide, N-vinyl pyrrole, N-vinyl pyridine, N-vinyl pyrrolidone and N-vinyl imidazole; and as well as monoalkyl amine, monoalkyl dimethylamine, alkylpropyl diamine, alkyldipropyl triamine, alkyltripropyl tetramine, polyoxyethylene alkylmethylbenzyl ammonium salt, alkylamine acetate and tetraalkylammonium chloride.

Examples of polymers of the amphoteric compound include betaine compounds.

The polymer compound used in the invention preferably has a mass average molecular weight of no less than 2,000 and not larger than 15,000. The pigment cannot be stably dispersed when the molecular weight of the polymer compound is less than 2,000, while the viscosity of the liquid becomes so high that ejectability may be deteriorated when the molecular weight exceeds 15,000. The molecular weight is more preferably no less than 3,500 and not larger than 10,000.

An acid value or a hydroxyl value may be used as an index of the pH sensitivity of the polymer compound.

The polymer compound is added in the pigment-containing liquid in the range of no less than 0.1% by mass and no greater than 5% by mass. The viscosity of the liquid becomes so high that ejectability of the liquid becomes unstable when the amount of addition exceeds 5% by mass, while dispersion stability may be decreased when the amount of addition is less than 0.1% by mass. The amount of addition of the polymer compound is preferably no less than 0.15% by mass and not larger than 3% by mass, and more preferably no less than 0.2% by mass and not larger than 2% by mass.

While the colorant is essential in the liquid (a) as described above, it may be added in either one of or both of the liquid (b) and the liquid (c). Colorants as described above may also be used when the colorant is added in the liquid (b) and the liquid (c).

While two kinds or more of the colorants may be used together in each of the liquid (a) to the liquid (c), it is more preferable to use a single colorant in each liquid, and to avoid using plural of colorants in the same liquid. While the hues of the colorants used in etch of the liquid (a) to the liquid (c) are not particularly restricted, the colorant in the liquid (a) is preferably black-colored, and the colorants contained in the liquid (b) and the liquid (c) have colors other than black.

(Water-Soluble Solvent)

While a water-soluble organic solvent may be appropriately used for preparing each liquid so long as it is soluble in water in a concentration of no less than 0.1% by mass, preferably used solvents include polyvalent alcohols, polyvalent alcohol derivatives, nitrogen-containing solvents, alcohols and sulfur-containing solvents.

Examples of the polyvalent alcohol include ethyleneglycol, diethyleneglycol, propyleneglycol, butyleneglycol, triethyleneglycol, 1,5-pentanediol, 1,2,6-hexanetriol and glycerin.

Examples of the polyvalent alcohol derivative include ethyleneglycol monomethylether, ethyleneglycol monoethylether, ethyleneglycol monobutylether, diethyleneglycol monomethylether, diethyleneglycol monoethylether, diethyleneglycol monobutylether, propyleneglycol monobutylether, dipropyleneglycol monobutylether, and ethyleneoxide adduct of diglycerine.

Examples of the nitrogen-containing solvent include pyrrolidone, N-methyl-2-pyrrolidone, cyclohexyl pyrrolidone and triethanolamine; examples of the alcohol include ethanol, isopropyl alcohol, butyl alcohol and benzyl alcohol; and examples of the sulfur-containing solvent include such as thiodiethanol, thiodiglycerol, sulfolane and dimethylsulfoxide. Other solvents that may be used include propylene carbonate and ethylene carbonate.

At least one kind of the water-soluble organic solvents is preferably used in the invention. The content of the water-soluble organic solvent used in the liquid (a) to liquid (c) is no less than 1% by mass and not larger than 60% by mass, and preferably no less than 5% by mass and not larger than 40% by mass. A sufficient optical density cannot be obtained when the content of the water-soluble organic solvent in liquid is less than 1% by mass, while the viscosity of the liquid becomes too high that ejection characteristics of the liquid become unstable when the content is larger than 60% by mass.

(Surfactant)

A surfactant may be added in each liquid. Any surfactants may be used in the invention so long as they have a structure having hydrophilic portions and hydrophobic portions together in the molecule, and can be use surfactants may be any of anionic, cationic, amphoteric and nonionic surfactants. The polymer compound described above may be also used.

Examples of the anionic surfactant include alkylbenzene sulfonate, alkylphenyl sulfonate, alkylnaphthalene sulfonate, higher fatty acids, higher fatty acid ester sulfate, higher fatty acid ester sulfonate, higher alcohol ether sulfate and sulfonate, higher alkyl sulfosuccinate, higher alkyl phosphate and phosphate ester of higher alcohol-ethylene oxide adduct; and dodecylbenzene sulfonate, kerylbenzene sulfonate, isopropylnaphthalene sulfonate, monobutylphenylphenol monosulfonate, monobutylbiphenyl sulfonate, monobutylphenyl sulfonate and dibutylphenylphenol disulfonate may be also effectively used.

Examples of the nonionic surfactant include polypropyleneglycol ethyleneoxide adduct, polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, oxyethylene adduct of acetylene glycol, fatty acid alkanolamide, glycerin ester and sorbitan ester.

Examples of the cationic surfactant include tetraalkyl ammonium salts, alkylamine salts, benzarconium salts, alkylpyridium salts and imidazolium salts, and particularly dihydroxyethyl stearylamine, 2-heptadecenyl-hydroxyethyl imidazoline, lauryldimethylbenzyl ammonium chloride, cetylpyridinium chloride and stearamide methylpyridium chloride.

Bio-surfactants such as spicrispolic acid, rhamnolipid and lysolecithin may be also used.

The amount of the surfactant added in the liquid of the invention is preferably less than 10% by mass, more preferably no less than 0.01% by mass and not larger than 5% by mass, and further preferably no less than 0.01% by mass and not larger than 3% by mass. Optical density, and storability of the pigment ink may be deteriorated when the amount of addition is 10% by mass or larger.

The heterocyclic compound represented by the general formula (I) is preferably added in the liquid (b) when the anionic compound is used as the colorant in the ink set for ink-jet recording of the invention.

X in the general formula (I) represents O, NH, NR, S or $SO_2$, R represents an alkyl group, and n represents an integer from 3 to 6. This means that the number of the carbon atoms involved in forming the ring of the heterocyclic compound is 3 to 6. While m represents an integer of 0 to 7, this means that the heterocyclic compound is able to have up to 7 alkyl groups as substituents.

Any heterocyclic compound structures having carboxylic groups may be used as the heterocyclic compound represented by the general formula (I) used in the invention, so long as the number of the carbon atoms constituting the ring, and the substituents that are able to be introduced satisfy the general formula (I). Specific examples of the compound are those having a furan, pyrrole, pyrroline, pyrrolidone, pyrone, pyrrole, thiophene, indole, pyridine and quinone structures while having the carboxylic group as the functional group. Examples of the compound include 2-pyrrolidone-5-carboxylic acid, 4-methyl-4-pentanolid-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolid-3-carboxylic acid, 3-hydroxy-4-pyron-2,6-dicarboxylic acid, 2-pyron-6-carboxylic acid, 4-pyron-2-carboxylic acid, 5-hydroxy-4-pyron-5-carboxylic acid, 4-pyron-2,6-dicarboxylic acid, 3-hydroxy-4-pyron-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propinonic acid, 2-pyrrolidine carboxylic acid, 4-hydroxyproline, 1-methylpyrrolidine-2-carboxylic acid, 5-carboxy-1-methylpyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pantacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid and 6-methoxy-4-quinoline carboxylic acid.

Such a heterocyclic compound is preferably contained in a quantity of 0.01 to 20% by mass, and more preferably in a quantity of 0.1 to 12% by mass, in the liquid (b).

It is necessary that the second and third liquids of the invention contain the pH adjusting agent. Examples of the pH adjusting agent that is favorably used in the invention and can adjust the conductivity and pH and include alkali metal compounds such as potassium hydroxide, sodium hydroxide and lithium hydroxide; nitrogen-containing compounds such as ammonium hydroxide, triethanolamine, diethanolamine and 2-amino-2-methyl-1-pripanol; alkali earth metal compounds such a calcium hydroxide; acids such as sulfuric acid, hydrochloric acid and nitric acid; and salts of strong acids and weak alkalis such as ammonium sulfate.

The pH and conductivity used in the invention are measured with a pH/conductivity meter (MPC 227, manufactured by Mettler-Tored Co.) at a temperature of 23±0.5° C. and a humidity of 55±5% RH.

The pH adjusting agent is appropriately added so that the second and third liquids conform to fulfil the above mentioned pH conditions. The pH of the second liquid and the pH of the third liquid are determined depending on whether the colorant contained in the first liquid is anionic or cationic, and the kind and amount of addition of the pH adjusting agent are selected in accordance therewith.

(Other Additives)

Polyethylene imine, polyamine, polyvinyl pyrrolidone, polyethyleneglycol, cellulose derivatives such as ethyl cellulose and carboxymethyl cellulose, polysaccharides and derivatives thereof, other water-soluble polymers, polymer emulsions such as acrylic polymer emulsions and polyurethane emulsions, cyclodextrin, macrocyclic amine, dendrimer, crown ethers, urea and its derivatives, acetamide, silicone-based surfactants and fluorine-based surfactants may be added in each of the liquid (a) to the liquid (c) in order to control characteristics such as ejectability.

pH adjusting agents, antioxidants, fungicides, viscosity control agents, conductive agents, UV absorbing agents, chelating agents and the like may be also added, if necessary.

(Ink Set Containing Liquid (a) to Liquid (c))

A method for improving the image quality such as the optical density and feathering has been proposed by designing an ink that is coagulated by mixing two liquids. However, since the ink is coagulated in an waste ink tank by mixing different inks when such method is employed, the coagulating inks should be disposed in separate tanks. Accordingly, it has been a problem that the size of the maintenance unit becomes large and the cost of the apparatus increases.

The invention has solved this problem by arranging an ink set for inkjet recording, wherein the following combinations that suppress the inks from being coagulated are selected.

The invention provides an ink set for ink-jet recording comprising at least a liquid (a) containing at least a colorant, water soluble solvent and water, and a liquid (b) containing at least a pH adjusting agent, water soluble solvent and water, and a liquid (c), and which satisfies the following conditions:
(i) the colorant is anionic,
(ii) the liquid (b) has a pH of not higher than 6.5,
(iii) the liquid (c) has a pH of not lower than 8.0, and
(iv) a mixed liquid of the liquid (b) and the liquid (c) in a mass ratio of 1:1 has a pH of not lower than 7; or
(i) the colorant is cationic,
(ii) the liquid (b) has a pH of not lower than 8.5,
(iii) the liquid (c) has a pH of not higher than 6.0, and
(iv) a mixed liquid of the liquid (b) and the liquid (c) in a mass ratio of 1:1 has a pH of not higher than 7.

The pH of the mixed liquid is adjusted to near a neutral pH when the three kinds of the liquids are mixed. As a result, the colorant and pH sensitive resin in the first ink are effectively suppressed from being coagulated by the coagulant in the liquid (b).

Coagulation of the mixed liquid of three kind of the liquids housed in the waste ink tank can be prevented by suppressing the liquids from being coagulated, and it is possible to provide only one waste ink tank. Consequently, the size of the maintenance unit is reduced to enable the cost to be decreased.

The image quality such as optical density and feathering have been improved in the invention by designing the inks so that the liquid (a) and the liquid (b) are coagulated by mixing them. On the other hand, the liquid (a) to the liquid (c) have been designed so that constituent components thereof are inhibited from being coagulated in the waste ink tank in which the three kinds of the liquids are mixed. Accordingly, the inventors have succeeded in reducing the size of the maintenance unit and expanding the service life of the maintenance unit.

The degree of coagulation is practically judged by the number of coarse particles with a diameter of not smaller than 5 μm contained in the mixed liquid of the liquid (a) and the liquid (b), wherein the number is preferably no less than 1,000 particles/μL, more preferably no less than 2,500 particles/μL, and further preferably no less than 5,000 particles/μL. The optical density often decreases when the number of the coarse particles in the mixed liquid of the liquid (a) and the liquid (b) is less than 1,000 particles/μL.

The number of the coarse particles with a diameter of no less than 5 μm in the mixed liquid of the liquid (a) and the liquid (b) is measured in the invention using an Accusizer TM770 Optical Particle Sizer (manufactured by Particle Sizing Systems Co.) by sampling 2 μL of the mixed liquid with stirring after mixing the two liquids in a mass ratio of 1:1. A density of the pigment is used as the density of the dispersed particles as an input parameter for the measurement. The density of the pigment powder obtained by drying a pigment dispersion by heating is measured using a specific gravity hydrometer or a pycnometer.

The number of the coarse particles having a diameter of no less than 5 µm contained in a mixed liquids of the liquid (a), liquid (b) and the liquid (c) is preferably less than 1,000 particles/µL, more preferably less than 500 particles/µL, and further preferably less than 100 particles/µL. The service life of the maintenance unit is often shortened when the number of the coarse particles having a diameter of no less than 5 µm contained in a mixed liquids of the liquid (a), liquid (b) and the liquid (c) is more than 1,000 particles/µL.

The number of the coarse particles with a diameter of no less than 5 µm in the mixed liquid of the liquid (a), liquid (b) and the liquid (c) is measured in the invention using Accusizer TM770 Optical Particle Sizer (manufactured by Particle Sizing Systems Co.) by sampling 2 µL of the mixed liquid with stirring after mixing the three liquids in a mass ratio of 1:1:1.

The recording material of the invention can be used for conventional ink-jet recording apparatus as well as for a recording apparatus mounting a heater for controlling drying of the ink, and for a recording apparatus mounting an intermediate transfer mechanism for transferring onto a paper sheet after printing the recording material on an intermediate member.

An excellent image having high optical density and being suppressed in feathering and intercolor bleed is obtained with a short drying time and high reliability of the maintenance unit, by recording using such ink set for ink-jet recording. The ink set for ink-jet recording of the invention is not only able to afford the excellent image as described above, but also a maintenance unit excellent in reliability and a small volume waste ink tank.

The invention also provides an ink-jet recording method by ejecting each liquid in the ink set for ink-jet recording onto a recording medium, wherein the ink set for ink-jet recording comprises at least a liquid (a) containing at least a colorant, water soluble solvent and water, a liquid (b) containing at least a pH adjusting agent, water soluble solvent and water, and a liquid (c) satisfying the following conditions:
(i) the colorant is anionic,
(ii) the liquid (b) has a pH of not higher than 6.5,
(iii) the liquid (c) has a pH of not lower than 8.0, and
(iv) a mixed liquid of the liquid (b) and the liquid (c) in a mass ratio of 1:1 has a pH of not lower than 7; or
(i) the colorant is cationic,
(ii) the liquid (b) has a pH of not lower than 8.5,
(iii) the liquid (c) has a pH of not higher than 6.0, and
(iv) a mixed liquid of the liquid (b) and the liquid (c) in a mass ratio of 1:1 has a pH of not higher than 7.

The invention also provides an ink-jet recording apparatus comprising a recording head for ejecting each liquid in the ink set for ink-jet recording, wherein the ink set for ink-jet recording comprises at least a liquid (a) containing a colorant, water soluble solvent and water, a liquid (b) containing a pH adjusting agent, water soluble solvent and water, and a liquid (c) that satisfy any one of the conditions above.

Preferable embodiments of the ink-jet recording apparatus of the invention will be described in detail below with reference to drawings. The same or corresponding portions in the drawings are given the same reference numerals, and repeated descriptions thereof are omitted.

Figure 1:
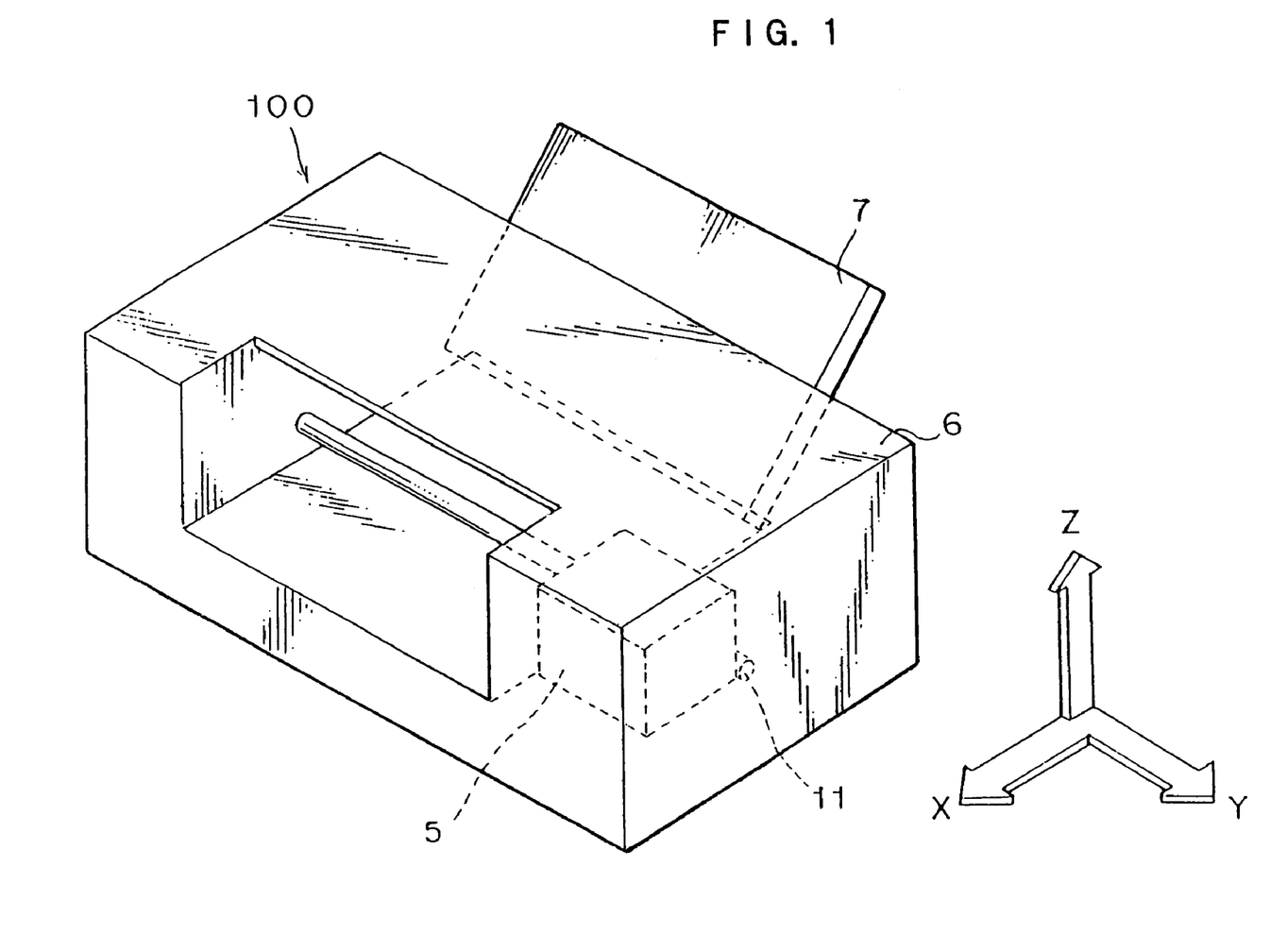
FIG. 1 is a perspective view showing an outer construction of an ink-jet recording apparatus in a preferred embodiment of the present invention.
Figure 2:
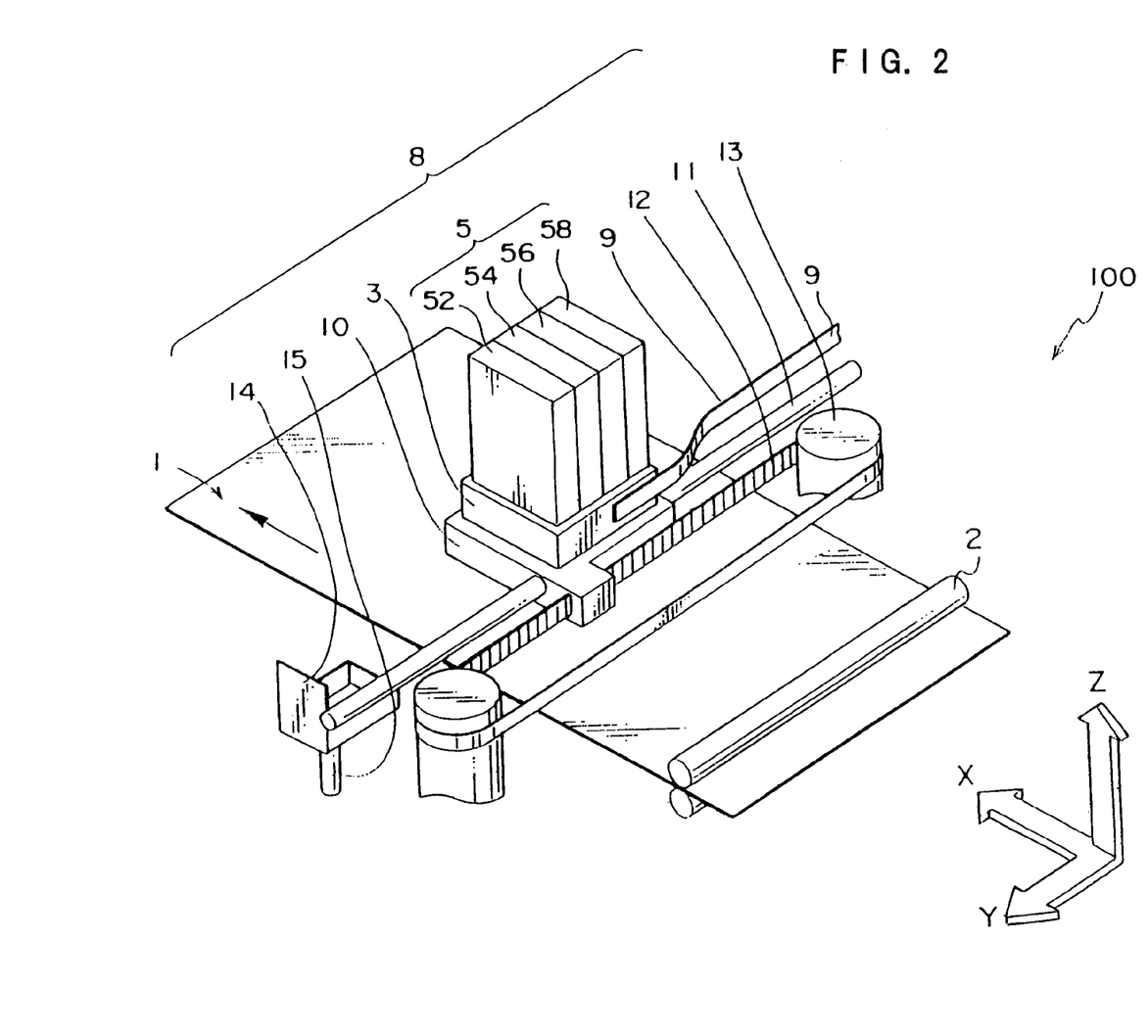
FIG. 2 is a perspective view showing a basic inner structure of the ink-jet recording apparatus shown in FIG. 1.

FIG. 1 is a perspective view showing an outer construction of the ink-jet recording apparatus in a preferred embodiment of the invention. FIG. 2 is a perspective view showing a basic inner structure of the ink-jet recording apparatus (named as image forming apparatus hereinafter) shown in FIG. 1. The image forming apparatus 100 in this embodiment is constructed so that it is operated depending on the ink-jet recording method of the invention for forming an image. As shown in FIGS. 1 and 2, the image forming apparatus 100 mainly comprises an outer cover 6; a tray 7 capable of mounting a given quantity of recording medium 1 such as plain paper; a convey roller 2 (convey device) for transporting the recording medium 1 into the image forming apparatus 100 one by one; and an image forming part 8 (image forming device) for forming an image by ejecting the ink and liquid (c)omposition on the surface of the recording medium 1.

The convey roller 2 is a pair of rollers rotatably disposed in the image forming apparatus 100. The recording medium 1 mounted on the tray 7 is held with the rollers, and a given number of sheets of the recording medium 1 is transported one by one into the apparatus 100 at a given timing.

The image forming portion 8 forms an image on the surface of the recording medium 1. The image forming portion 8 mainly comprises a recording head 3, an ink tank 5, a power feed cable 9, a carriage 10, a guide rod 11, a timing belt 12, a drive pulley 13, and a maintenance unit 14.

The ink tank 5 comprises ejectably housed ink tanks 52, 54, 56 and 58 filled with respective inks or liquid (c)ompositions having different colors with each other.

The liquid (a), liquid (b) and the liquid (c) of the invention are filled in these ink tanks.

As shown in FIG. 2, the power feed cable 9 and ink tank 5 are connected to the recording head 3. The recording head 3 sucks a given amount of ink from each ink tank based on image recording information when image recording information is given to the recording head 3 from the outside through the power feed cable 9, and ejects the ink on the surface of the recording medium. The power feed cable 9 also serves for supplying an electricity required for addressing the recording head 3 to the recording head 3 other than image recording information.

The recording head 3 is held by being arranged on the carriage 10, and the timing belt 12 is connected to the carriage 10 coupled with the guide rod 11 and driving pulley 13. This construction permits the recording head 3 to travel in a direction Y (main scanning direction) parallel to the surface of the recording medium 1 and perpendicular to a convey direction X (sub-scanning direction) of the recording medium 1.

The image forming apparatus 100 comprises a control device (not shown) for controlling the addressing timing of the recording head 3 and addressing timing of the carriage 10 based on image recording information. This enables images based on image recording information to be continuously formed on a desired area on the surface of the recording medium 1 conveyed at a given speed.

The maintenance unit 14 is connected to an evacuation device (not shown) through a tube. The maintenance unit 14 is further connected to a nozzle portion of the recording head 3, and functions so as to suck the ink from the nozzle of the recording head 3 by evacuating the inside of the nozzle of the recording head 3. Providing the maintenance unit 14 permits excess inks adhered on the nozzle during the operation of the image forming apparatus 100 to be removed, if necessary, and the ink to be suppressed from being evaporated off from the nozzle when the operation of the apparatus is suspended.

Figure 3:
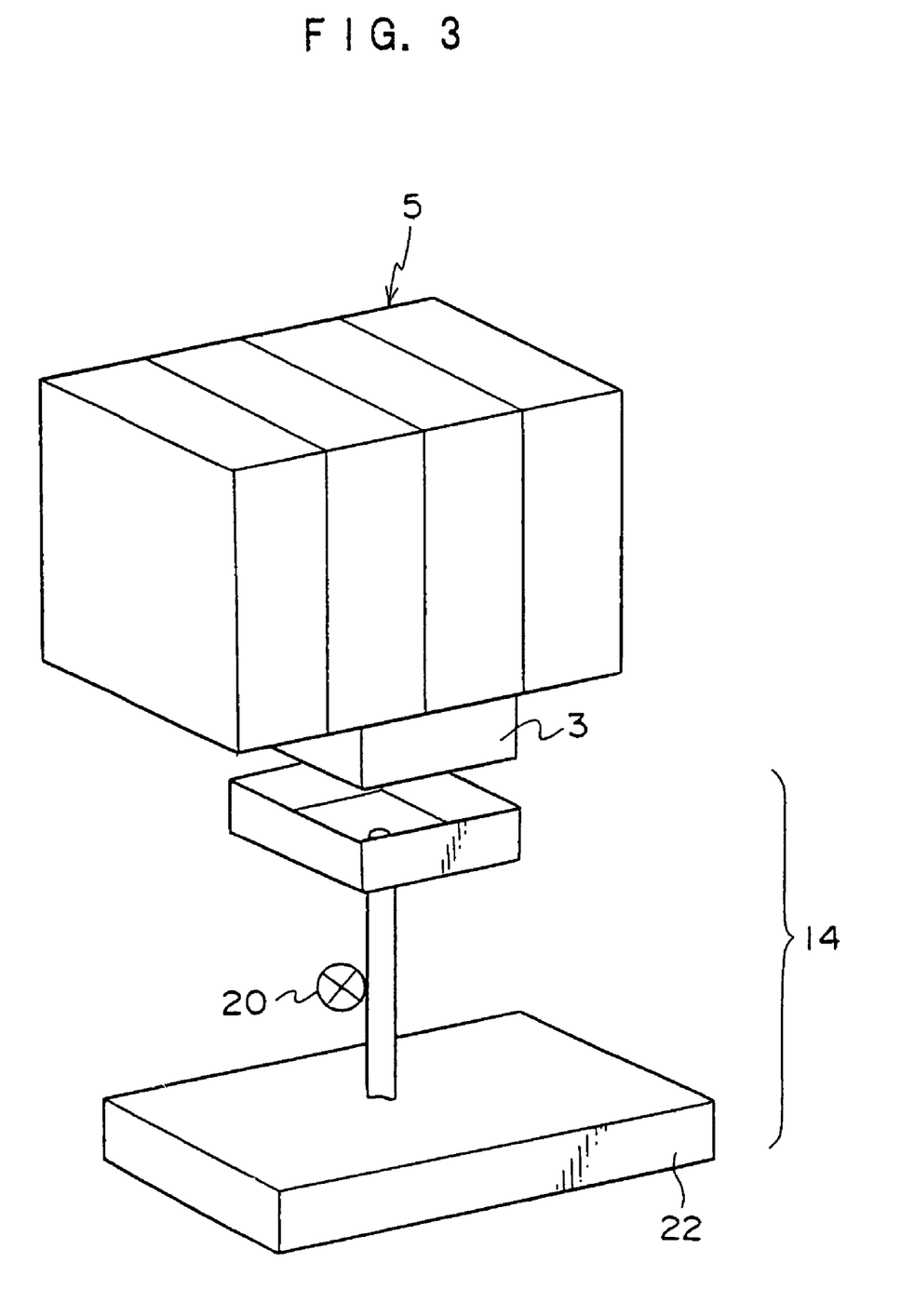
FIG. 3 is a perspective schematic view showing an outer construction of a maintenance unit connected to a recording head nozzle portion of an ink tank in the ink-jet recording apparatus of the invention.

FIG. 3 is a perspective schematic view showing an outer construction of the maintenance unit 14 connected to the nozzle part of the recording head 3 of the ink tank 5.

An evacuation device 20 is disposed in the maintenance unit 14 connected to the nozzle part of the recording head 3 of the ink tank 5, and the ink is sucked from the nozzle by evacuating the inside of the nozzle of the recording head 3. The excess ink sucked is drained in an waste ink tank 22. Since coagulation of the colorants is suppressed when the liquid (a), liquid (b) and the liquid (c) are mixed by using the ink set for ink-jet recording of the invention, only one waste ink tank 20 provided by being coupled with the maintenance unit 14 is sufficient for housing all the waste ink. Consequently, the volume of the maintenance unit 14 can be reduced.

Figure 4:
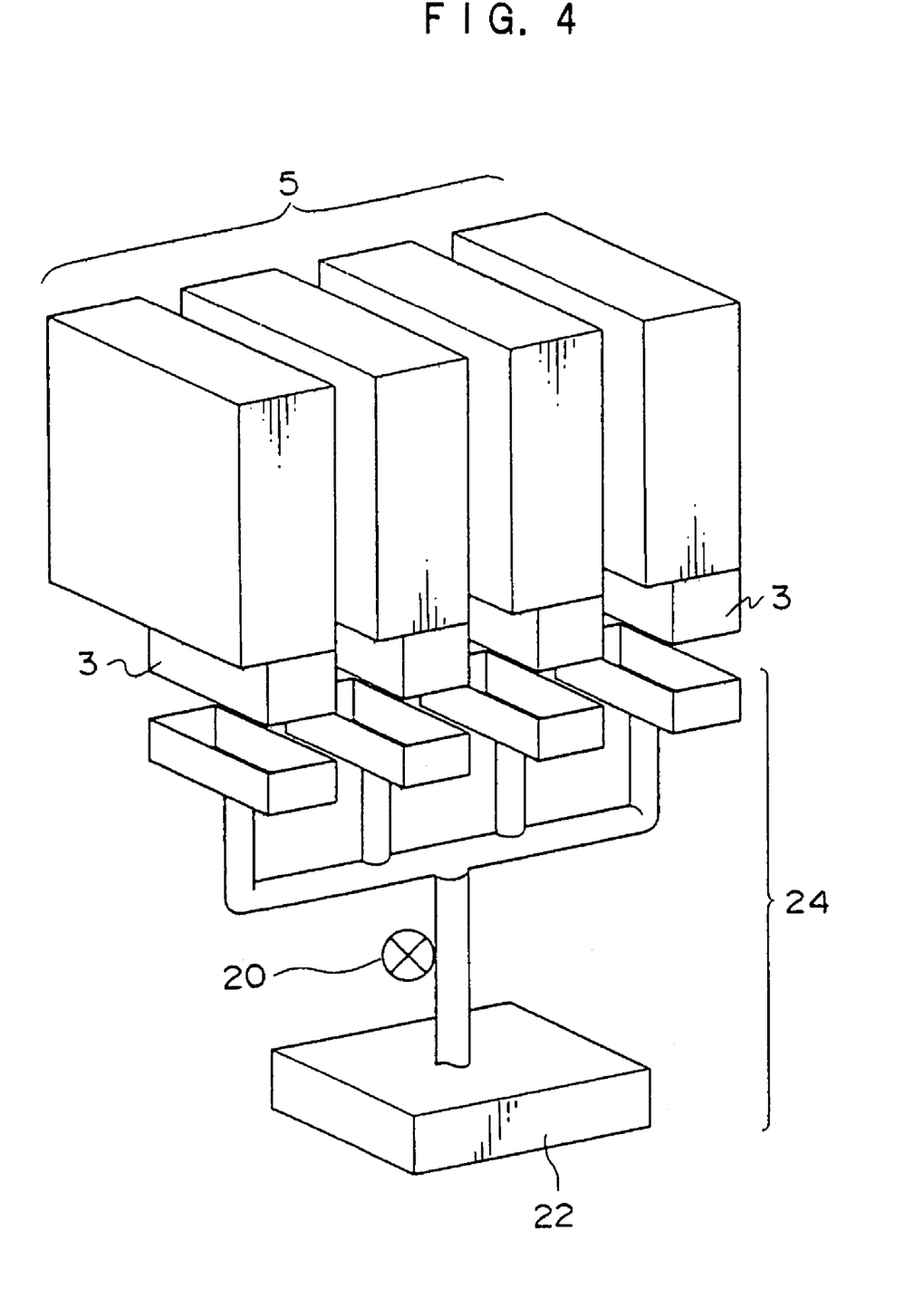
FIG. 4 is a perspective schematic view showing another embodiment of the maintenance unit provided in the ink-jet recording apparatus of the invention.
Figure 5:
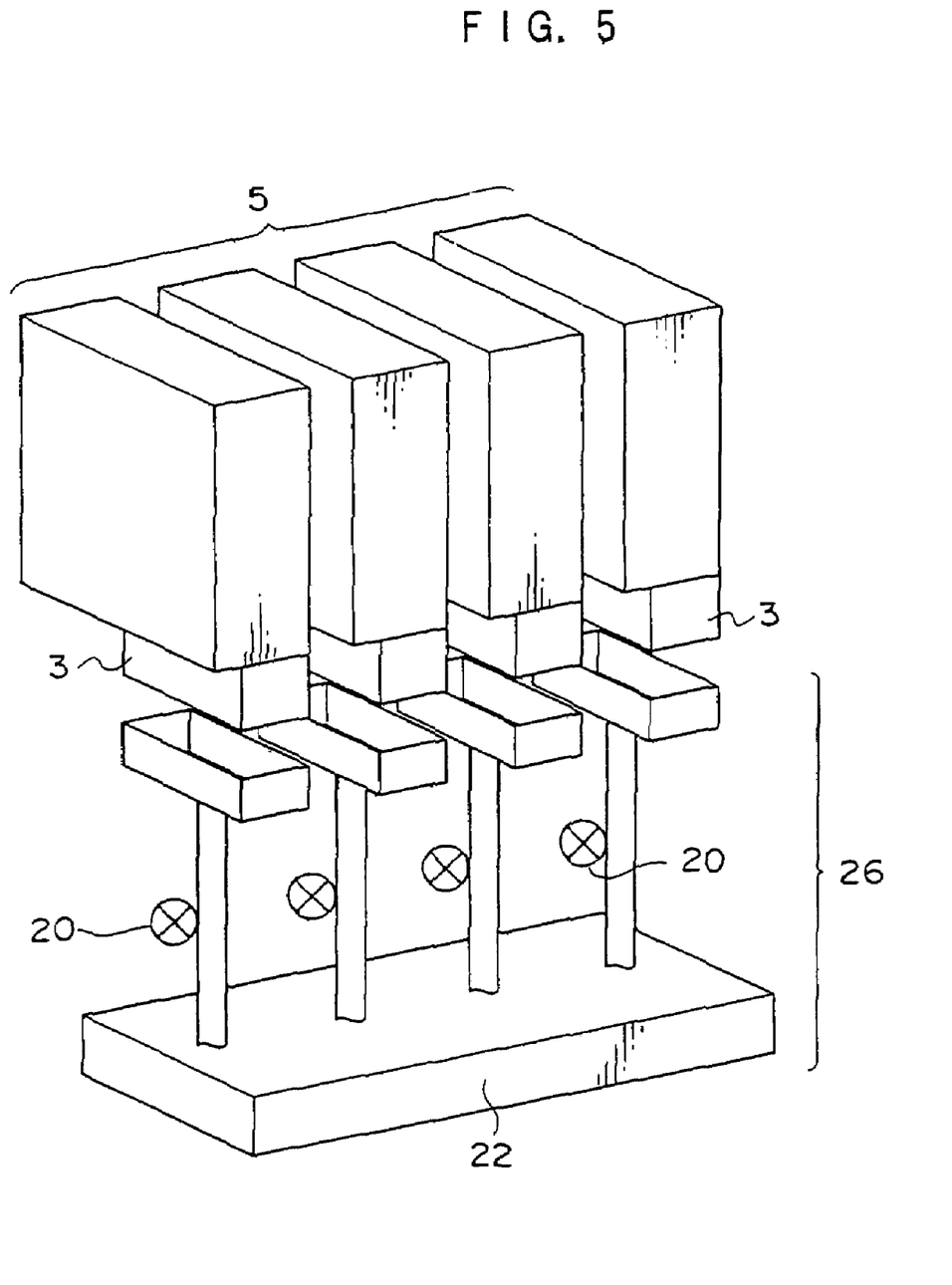
FIG. 5 is a perspective schematic view showing an embodiment comprising a plurality of evacuating devices of the maintenance unit provided in the ink-jet recording apparatus of the invention.

FIGS. 4 and 5 are schematic drawings showing different embodiments of the maintenance units 24 and 26 arranged in the ink-jet recording apparatus of the invention. As shown in FIG. 4, coupling members are provided at respective plural recording heads 3, and a line of tubes connected to respective recording heads is evacuated with an evacuation device 20 to introduce the ink to an waste ink tans 22. Alternatively, members connected to respective plural recording heads are provided as shown in FIG. 5, and an evacuation device 20 is provided at each of the tubes connected to each member to suck the waste ink into the waste ink tank 22. Since only one waste ink tank 22 is necessary in both cases, the volume of the maintenance unit 14 becomes smaller than that of the conventional apparatus.

The ink-jet recording apparatus of the invention preferably comprises a maintenance mechanism for maintaining the pH of the liquid in the maintenance unit at 5 to 9. On the other hand, the maintenance mechanism is preferably able to keep the conductivity of the liquid (a)t no greater than 5.0 S/m, more preferably at 4.0 S/m, and further preferably at 0.5 S/m. An examples of such mechanism is to provide a pH meter or a conductivity meter in the waste ink tank 22 of the maintenance unit 14, and to feed a required liquid to the waste ink tank according to measured data of the waste in the maintenance unit.

The surface tension of the liquid (a) of the invention is preferably no less than 15 mN/m and no greater than 60 mN/m, more preferably no less than 15 mN/m and no greater than 45 mN/m, and further preferably no less than 20 mN/m and no greater than 35 mN/m.

The liquid overflows the nozzle surface when the surface tension is less than 15 mN/m to make normal printing impossible. On the other hand, permeation of the ink is retarded when the surface tension exceeds 60 mN/m to prolong the drying time.

The surface tension of the liquid (b) and the liquid (c) of the invention is preferably no less than 15 mN/m and no greater than 45 mN/m, more preferably no less than 19 mN/m and no greater than 39 mN/m, and further preferably no less than 20 mN/m and no greater than 30 mN/m.

The liquid overflows the nozzle surface when the surface tension is less than 15 mN/m to make normal printing impossible. On the other hand, permeation of the ink is retarded when the surface tension exceeds 45 mN/m to prolong the drying time.

The viscosity of the liquid (a), liquid (b) and the liquid (c) of the invention is preferably no less than 1.2 mPa·s and no greater than 8.0 mPa·s, more preferably no less than 1.5 mPa·s and no greater than 4.5 mPa·s, and further preferably no less than 1.8 mPa·s and no greater than 4.0 mPa·s. Ejectability decreases when the viscosity of the liquid (a). Liquid (b) and the liquid (c) is larger than 8.0 mPa·s, while long term reliability decreases when the viscosity is smaller than 1.2 mPa·s.

The mass of the liquid per one drop is preferably no greater than 25 ng, more preferably no less than 0.5 ng and no greater than 20 ng, and further preferably no less than 2 ng and no greater than 8 ng in the invention. Feathering becomes evident when the mass of the liquid per one drop exceeds 25 ng, since the contact angle of the liquid (a) and liquid (b) to the recording medium increases depending on the mass of the drop, and the drop tends to be spread on the surface of the paper sheet when the mass of the drop increases.

However, the mass of the smallest drop capable of printing is used in the ink-jet recording apparatus that is able to eject plural volumes of drops from one nozzle.

The ink is preferably applied on the recording medium so that the liquid (a) contacts the liquid (b). The ink is coagulated by the action of the coagulant by allowing the liquid (a) to contact the liquid (b), which affords an excellent recording method by which an image having a high optical density is obtained in a short period of drying time without feathering and intercolor bleed.

The order for applying the liquids (inks) on the recording medium is not particularly restricted, so long as the liquid (c) is finally applied.

The thermal ink-jet recording method or piezoelectric ink-jet recording method is preferably employed from the view point of improving feathering and intercolor bleed. While the reason thereof is not clear yet, the ink is heated during ejection in the thermal ink-jet method to decrease the viscosity of the ink. Since the temperature of the ink decreases on the recording medium, the viscosity rapidly increases to afford an improving effect of feathering and intercolor bleed. On the other hand, since ejection of a high viscosity liquid, which is able to suppress spreading on the surface of the paper sheet of the recording medium, is possible by the piezoelectric ink-jet method, this method is conjectured to afford an improving effect of feathering and intercolor bleed.

EXAMPLES

The present invention will be described in detail with reference to examples.

<Pigment Treatment Method>1

An aqueous solution of sulfanilic acid is wormed in a vessel, and 100 g of a pigment is added thereto with stirring. After cooling the mixed solution to room temperature with stirring, 14 g of conc. nitric acid is added dropwise. An aqueous solution (10 g) of $NaNO_2$ is added to the solution, and the solution is continued to stir until the reaction is completed. The pigment thus prepared is desalted. Ion-exchange water is added to the surface-treated pigment obtained so that the concentration of the pigment is 12 wt %. After adjusting the pH, the solution is centrifuged (8,000 rpm×30 minutes) to remove the residue (20% to the total fraction).

<Pigment Treatment Method>2

After applying a surface oxidation treatment to a pigment with sodium hypochlorite, the pigment is desalted. The surface-treated pigment thus obtained is added in ion-exchange water so that the concentration of the sample is 20% by mass, and the pigment is dispersed with a ultrasonic wave homogenizer after adjusting the pH at 7.5. The dispersion is centrifuged (8,000 rpm×30 minutes) to remove the residue (20% to the total fraction).

<Liquid Adjustment Metod>

A solution of a colorant, water soluble organic solvent, surfactant and ion-exchange water are blended according to the quantity described for each liquid so that the mixed solution has the following composition, and the solution is mixed by stirring. Desired liquids (liquids A to M) are obtained by filtering with a 2 μm filter.

(Liquid A)

| | |
|---|---|
| Cabojet-300 (surface-treated pigment, anionic, manufactured by Cabot Co.) | 4.5% by mass |
| styrene-acrylic acid-sodium acrylate copolymer (anionic) | 0.5% by mass |
| diethyleneglycol | 25% by mass |
| polyoxyethylene-2-ethylhexyl ether | 0.75% by mass |
| ion-exchange water | the balance |

This ink had a viscosity of 3.1 mPa·s, a surface tension of 34 mN/m, a pH of 7.9 and a conductivity of 0.05 S/m.

(Liquid B)

The pigment treated according to pigment treatment method 1 is formed into an ink by a given method.

| | |
|---|---|
| C.I. Pigment Blue 15:3 (surface-treated pigment, anionic) | 3% by mass |
| pyrrolidone carboxylic acid | 5.0% by mass |
| diethyleneglycol | 15% by mass |
| glycerin | 5% by mass |
| butyl carbitol | 5% by mass |
| acetyleneglycol-ethyleneoxide adduct | 1% by mass |
| sodium hydroxide | 0.63% by mass |
| ion-exchange water | the balance |

This ink had a viscosity of 2.7 mPa·s, a surface tension of 30 mN/m, a pH of 3.9 and a conductivity of 0.44 S/m.

(Liquid C)

The pigment treated according to pigment treatment method 1 is formed into an ink by a given method.

| | |
|---|---|
| C.I. Pigment Red 122 (surface-treated pigment, anionic) | 4.5% by mass |
| diethyleneglycol | 15% by mass |
| propyleneglycol | 10% by mass |
| acetyleneglycol-ethyleneoxide adduct | 1% by mass |
| boric acid | 0.31% by mass |
| potassium chloride | 0.37% by mass |
| sodium hydroxide | 0.14% by mass |
| ion-exchange water | the balance |

This ink had a viscosity of 2.6 mPa·s, a surface tension of 32 mN/m, a pH of 9.6 and a conductivity of 0.08 S/m.

(Liquid D)

The pigment treated according to pigment treatment method 2 is formed into an ink by a given method.

| | |
|---|---|
| Black Pearl L (surface-treated pigment, anionic) | 5% by mass |
| styrene-methacrylic acid-sodium methacrylate copolymer (anionic)] | 0.5% by mass |
| diethyleneglycol | 20% by mass |
| triethyleneglycol | 5% by mass |
| acetyleneglycol-ethyleneoxide adduct | 0.3% by mass |
| ion-exchange water | the balance |

This ink had a viscosity of 3.2 mPa·s, a surface tension of 31 mN/m, a pH of 8.1 and a conductivity of 0.05 S/m.

(Liquid E)

The pigment treated according to pigment treatment method 1 is formed into an ink by a given method.

| | |
|---|---|
| C.I. Pigment Blue 15:4 (surface-treated pigment, anionic) | 3% by mass |
| furan carboxylic acid | 7.5% by mass |
| diethyleneglycol | 15% by mass |
| sulfolane | 5% by mass |
| butyl carbitol | 5% by mass |
| acetylene-ethyleneoxide adduct | 1% by mass |
| sodium hydroxide | 0.94% by mass |
| ion-exchange water | the balance |

This ink had a viscosity of 2.6 mPa·s, a surface tension of 31 mN/m, a pH of 4.1 and a conductivity of 0.64 S/m.

(Liquid F)

The pigment treated according to pigment treatment method 1 is formed into an ink by a given method.

| | |
|---|---|
| C.I. Pigment Red 122 (surface treated pigment, anionic) | 4% by mass |
| styrene-methacrylic acid-sodium methacrylate copolymer (anionic) | 0.3% by mass |
| diethyleneglycol | 20% by mass |
| triethyleneglycol | 5% by mass |
| acetyleneglycol-ethyleneoxide adduct | 1% by mass |
| boric acid | 0.31% by mass |
| potassium chloride | 0.37% by mass |
| sodium hydroxide | 0.14% by mass |
| ion-exchange water | the balance |

This ink had a viscosity of 2.8 mPa·s, a surface tension of 33 mN/m, a pH of 9.6 and a conductivity of 0.04 S/m.

(Liquid G)

The pigment treated according to pigment treatment method 2 is formed into an ink by a given method.

| | |
|---|---|
| C.I. Pigment Yellow 128 (surface-treated pigment, anionic) | 4% by mass |
| styrene-methacrylic acid-sodium methacrylate copolymer (anionic) | 0.3% by mass |
| diethyleneglycol | 15% by mass |
| ethyleneglycol | 5% by mass |
| triethyleneglycol | 5% by mass |
| acetyleneglycol-ethyleneoxide adduct | 1% by mass |
| boric acid | 0.31% by mass |
| potassium chloride | 0.37% by mass |
| sodium hydroxide | 0.14% by mass |
| ion-exchange water | the balance |

This ink had a viscosity of 2.7 mPa·s, a surface tension of 32 mN/m, a pH of 9.7 and a conductivity of 0.04 S/m.

(Liquid H)

The pigment treated according to pigment treatment method 2 is formed into an ink by a given method.

| | |
|---|---|
| C.I. Pigment Red 122 (surface-treated pigment, anionic) | 4% by mass |
| styrene-acrylic acid-sodium acrylate copolymer (anionic) | 0.75% by mass |
| diethyleneglycol | 20% by mass |
| triethyleneglycol | 5% by mass |
| acetyleneglycol-ethyleneoxide adduct | 1% by mass |
| ion-exchange water | the balance |

This ink had a viscosity of 3.4 mPa·s, a surface tension of 33 mN/m, a pH of 7.9 and a conductivity of 0.06 S/m.

(Liquid I)

The pigment treated according to pigment treatment method 2 is formed into an ink by a given method.

| | |
|---|---|
| C.I. Pigment Yellow 128 (surface-treated pigment, anionic) | 4% by mass |
| styrene-acrylic acid-sodium acrylate copolymer (anionic) | 0.8% by mass |
| diethyleneglycol | 15% by mass |
| glycerin | 10% by mass |
| acetyleneglycol-ethyleneoxide adduct | 1% by mass |
| ion-exchange water | the balance |

This ink had a viscosity of 3.3 mPa·s, a surface tension of 32 mN/m, a pH of 8.1 and a conductivity of 0.06 S/m.

(Liquid J)

| | |
|---|---|
| Regal 330 (pigment, manufactured by Cabot Co.) | 4.5% by mass |
| N-oleyl-1,3-diaminopropane (cationic dispersant) | 0.5% by mass |
| diethyleneglycol | 20% by mass |
| N-methyl pyrrolidone | 5% by mass |
| acetyleneglycol-ethyleneoxide adduct | 0.25% by mass |
| ion-exchange water | the balance |

This ink had a viscosity of 3.1 mPa·s, a surface tension of 32 mN/m, a pH of 4.6 and a conductivity of 0.05 S/m.

(Liquid K)

| | |
|---|---|
| Cabojet-260 (surface-treated pigment, anionic, manufactured by Cabot Co.) | 4% by mass |
| styrene-acrylic acid-sodium acrylate copolymer | 0.5% by mass |
| diethyleneglycol | 15% by mass |
| ethyleneglycol | 5% by mass |
| propyleneglycol | 5% by mass |
| acetyleneglycol-ethyleneoxide adduct | 1% by mass |
| boric acid | 0.31% by mass |
| potassium chloride | 0.37% by mass |
| sodium hydroxide | 0.14% by mass |
| ion-exchange water | the balance |

This ink had a viscosity of 3.0 mPa·s, a surface tension of 32 mN/m, a pH of 8.8 and a conductivity of 0.05 S/m.

(Liquid L)

The pigment treated by pigment treatment method 1 is formed into an ink by a given method.

| | |
|---|---|
| C.I. Pigment Blue 15:3 (surface-treated pigment, anionic) | 4% by mass |
| furan carboxylic acid | 5.0% by mass |
| diethyleneglycol | 20% by mass |
| thiodiethanol | 5% by mass |
| acetyleneglycol-ethyleneoxide adduct | 1% by mass |
| sodium hydroxide | 0.63% by mass |
| ion-exchange water | the balance |

This ink had a viscosity of 2.8 mPa·s, a surface tension of 32 mN/m, a pH of 4.1 and a conductivity of 0.42 S/m.

(Liquid M)

The pigment treated by pigment treatment method 1 is formed into an ink by a given method.

| | |
|---|---|
| C.I. Pigment Blue 15:3 (surface-treated pigment, anionic) | 4% by mass |
| diethyleneglycol | 20% by mass |
| thiodiethanol | 5% by mass |
| acetyleneglycol-ethyleneoxide adduct | 1% by mass |
| ion-exchange water | the balance |

This ink had a viscosity of 2.7 mPa·s, a surface tension of 32 mN/m, a pH of 7.8 and a conductivity of 0.02 S/m.

<Evaluation Method by Printing>

The test printer used had a plurality of test print heads with a dot density of 800 dpi and a nozzle number of 256, and a maintenance unit capable of housing a plurality of inks in one unit. The liquid (c) is printed on C2 paper (manufactured by Fuji Xerox Co.) after printing the liquid (a), the liquid (b) and another liquid (a liquid (d)) with a combination of liquids A to M obtained above by the combinations as shown in Table 1. The test printing is carried out under a general environment (a temperature of 23±0.5° C., a humidity of 55±5% RH), and samples after placing under the general condition for 24 hours after printing are evaluated as follows.

(Optical Density)

The optical density of printed portions is measured using X-Rite 404 (manufactured by X-Rite Co.)

-Evaluation Criteria (Black Ink)-

○: Optical density of no less than 1.4.
Δ: Optical density of no less than 1.3 and less than 1.4.
X: Optical density of less than 1.3.

-Evaluation Criteria (Color Ink)-

○: Optical density of no less than 1.1.
Δ: Optical density of no less than 1.0 and less than 1.1.
X: Optical density of less than 1.0.

(Intercolor Bleed)

A pattern in which different colors are adjoining to ne another is printed, and intercolor bleed is visually evaluated by comparing the degree of feathering at the boundaries among the colors with a previously determined limiting standard.

-Evaluation Criteria-

○: Few bleed.
Δ: Although bled is observed, it is within a permissible level.
X: Bleed is severe and out of the permissible level.

(Feathering)

A fine line pattern is printed, the degree of feathering of the printed portion is compared with a limiting standard to visually evaluate the degree of feathering.

○: Few feathering.

Δ: Although feathering is observed, it is within a permissible level.

X: Feathering is severe and out of the permissible level.

(Drying Time)

A 100% coverage pattern is printed, and another FX-P paper is compressed on the printed pattern with a load of $1.9 \times 10^4$ N/m² at a given lapse of time after printing. The time when no ink is transferred onto pressed FX-P paper is defined as the drying time.

-Evaluation Criteria-

○: Drying time of less than 3 seconds.

Δ: Drying time of not shorter than 3 seconds and less than 10 seconds.

X: Drying time of more than 10 seconds.

(Reliability of Maintenance Unit)

Maintenance operations are repeated 30 times for evaluating reliability of the maintenance unit. The maintenance unit 14 is connected to an evacuation device through a tube as well as to the nozzle portion of the recording head 3 as shown in FIG. 2. The maintenance unit functions so as to suck the ink from the nozzle of the recording head 3 by evacuating the inside of the nozzle of the recording head 3. The maintenance operation is to evacuate with the evacuation device.

After repeating the evacuation operations 30 times, the machine is allowed to stand for 1 week. A usual maintenance is carried out at the initial operation of the machine, and ejection state of the head is observed.

-Evaluation Criteria-

○: All the nozzles are ejecting.

Δ: While there are some non-ejecting nozzle at the initial operation, all the nozzles started to eject within 3 times of the maintenance operations.

X: There are bob-ejecting nozzles even after 3 times of maintenance operations.

-Evaluation Method of the Number of Coarse Particles-

The liquid (a) and the liquid (b) are mixed in 1:1 mass ratio, and 2 μL of a sample is extracted while stirring the mixed liquid. The number of the coarse particles having a diameter of not smaller than 5 μm in the liquid (a) and the liquid (b) is measured using Accusizer TM770 Optical Particle Sizer (manufactured by Particle Sizing Systems Co.) by mixing. The density of the pigment is used as the density of the dispersed particles as the parameter for the measurement.

The liquid (a), liquid (b) and the liquid (c) are mixed in 1:1:1 mass ratio, and 2 μL of a sample is extracted while stirring the mixed liquid. The number of the coarse particles having a diameter of not smaller than 5 μm in the liquid (a), liquid (b) and the liquid (c) is measured using Accusizer TM770 Optical Particle Sizer (manufactured by Particle Sizing Systems Co.) by mixing.

The results of evaluations by printing and number of coarse particles are listed in Table 1.

TABLE 1

| | | Name of Ink | pH | Property of Pigment | Mixed Liquid pH | Conductivity of Mixed Liquid(S/m) | γ (mN/m) | Viscosity (mPa · s) | Number of Coarse Particles in Mixed Liquid of Liquids 1 and 2 (particles/μL) |
|---|---|---|---|---|---|---|---|---|---|
| Example 1 | Liquid 1 | A | 7.9 | Anionic | 7.7 | 0.40 | 34 | 3.1 | 6420 |
| | Liquid 2 | B | 3.9 | — | | | 30 | 2.7 | |
| | Liquid 3 | C | 9.6 | — | | | 32 | 2.6 | — |
| Example 2 | Liquid 1 | D | 8.1 | Anionic | 7.8 | 0.48 | 31 | 3.2 | 2650 |
| | Liquid 2 | E | 4.1 | — | | | 31 | 2.6 | |
| | Liquid 3 | F | 9.6 | — | | | 33 | 2.8 | |
| | Liquid 4 | G | 9.7 | — | | | 32 | 2.7 | — |
| Example 3 | Liquid 1 | J | 4.6 | Cationic | 6.2 | 0.38 | 32 | 3.1 | 8570 |
| | Liquid 2 | K | 8.8 | — | | | 32 | 3.0 | |
| | Liquid 3 | L | 4.1 | — | | | 32 | 2.8 | — |
| Comparative Example 1 | Liquid 1 | A | 7.9 | Anionic | 6.4 | 0.36 | 34 | 3.1 | 6420 |
| | Liquid 2 | B | 3.9 | — | | | 30 | 2.7 | |
| | Liquid 3 | H | 7.9 | — | | | 33 | 3.4 | |
| | Liquid 4 | I | 8.1 | — | | | 32 | 3.3 | — |
| Comparative Example 2 | Liquid 1 | D | 8.1 | Anionic | 6.5 | 0.56 | 31 | 3.2 | 2650 |
| | Liquid 2 | E | 4.1 | — | | | 31 | 2.6 | |
| | Liquid 3 | H | 7.9 | — | | | 33 | 3.4 | |
| | Liquid 4 | I | 8.1 | — | | | 32 | 3.3 | — |
| Comparative Example 3 | Liquid 1 | D | 8.1 | Cationic | 7.8 | 0.05 | 31 | 3.2 | 30 |
| | Liquid 2 | M | 7.8 | — | | | 32 | 2.7 | |
| | Liquid 3 | H | 7.9 | — | | | 33 | 3.4 | — |

| | | Number of Coarse Particles in Mixed Liquid of Liquids 1, 2 and 3 (particles/μL) | Optical Density | Feathering | Intercolor Bleed | Drying Time | Reliability of Maintenance |
|---|---|---|---|---|---|---|---|
| Example 1 | Liquid 1 Liquid 2 Liquid 3 | 680 | ○ | ○ | ○ | ○ | ○ |
| Example 2 | Liquid 1 Liquid 2 | 150 | ○ | ○ | ○ | ○ | ○ |

TABLE 1-continued

| | | | | | | | | |
|---|---|---|---|---|---|---|---|---|
| Example 3 | Liquid 3 Liquid 4 Liquid 1 Liquid 2 Liquid 3 | 760 | ○ | ○ | ○ | ○ | ○ |
| Comparative Example 1 | Liquid 1 Liquid 2 Liquid 3 Liquid 4 | 7810 | ○ | ○ | ○ | ○ | X |
| Comparative Example 2 | Liquid 1 Liquid 2 Liquid 3 Liquid 4 | 3560 | ○ | ○ | ○ | ○ | X |
| Comparative Example 3 | Liquid 1 Liquid 2 Liquid 3 | 50 | X | X | ○ | ○ | ○ |

The optical density, feathering, intercolor bleed, drying time and reliability of the maintenance unit are excellent in Examples 1 to 3 of the invention as shown in Table 1. In the combination of the liquids of the invention, the number of the coarse particles having a particle diameter of no less than 5 μm in a mixed liquid of the liquid (a) and the liquid (b) is no less than 1000 particles/μL, while the number of the coarse particles having a particle diameter of no less than 5 μm in a mixed liquid of the liquid (a), liquid (b) and the liquid (c) is mot larger than 1000 particles/μL.

The invention claimed is:

1. An ink set for ink-jet recording comprising at least a liquid (a) containing at least a colorant, water soluble solvent and water; a liquid (b) containing at least a pH adjusting agent, water soluble solvent and water; and a liquid (c), wherein:
   (i) the colorant is anionic;
   (ii) the liquid (b) has a pH of not higher than 6.5;
   (iii) the liquid (c) has a pH of not lower than 8.0; and
   (iv) a mixed liquid of the liquid (b) and the liquid (c) in a mass ratio of 1:1 has a pH of not lower than 7, wherein the colorant in the liquid (a) is a pigment, and the pigment is selected from the group consisting of a pigment dispersed with a polymer dispersant, a self-dispersible pigment, and a pigment coated with a resin.

2. An ink set for ink-jet printing according to claim 1, wherein the liquid (b) comprises a heterocyclic compound represented by the following general formula (I):

(I)

wherein X represents O, NH, NR, S or SO2; R represents an alkyl group; n represents an integer from 3 to 6; and m represents an integer from 0 to 7.

3. An ink set for ink-jet recording according to claim 1, wherein a mixed liquid of the liquid (a) and the liquid (b) in a mass ratio of 1:1 has a coarse particles of no less than 1000 particles/μl, and a mixed liquid of the liquid (a) and liquid (b) and the liquid (c) in a mass ratio of 1:1:1 has a coarse particles of no more than 1000 particles/μl, said coarse particles having a diameter of no less than 5 μm.

4. An ink set for ink-jet printing according to claim 1, wherein a mixed liquid of the liquid (a), the liquid (b) and the liquid (c) in a mass ratio of 1:1:1 has a conductivity of not larger than 5.0 S/m.

5. An ink set for ink-jet recording according to claim 1, wherein the liquid (b) or the liquid (c) contains a colorant.

6. An ink set for ink-jet recording according to claim 1, wherein the liquid (a) has a surface tension of no less than 15 mN/m and not larger than 60 mN/m, or the liquid (b) and the liquid (c) each have a surface tension of no less than 15 mN/m and not larger than 45 mN/m.

7. An ink set for ink-jet recording according to claim 1, wherein the liquid (a), the liquid (b) and the liquid (c) each has a viscosity of no less than 1.2 mPa·s and not larger than 8.0 mPa·s.

8. An ink set for ink-jet recording comprising the liquid (a), the liquid (b), and the liquid (c), said liquid (a) containing the colorant, the water soluble solvent and water; said liquid (b) and liquid (c) containing the pH adjusting agent, the water soluble solvent and water, wherein:
   (i) the colorant is cationic;
   (ii) the liquid (b) has a pH of not lower than 8.5;
   (iii) the liquid (c) has a pH of not higher than 6.0; and
   (iv) a mixed liquid of the liquid (b) and the liquid (c) in a mass ratio of 1:1 has a pH of not higher than 7.

9. An ink set for ink-jet recording according to claim 8, wherein the number of coarse particles with a diameter of no less than 5 μm contained in a mixed liquid of the liquid (a) and the liquid (b) in a mass ratio of 1:1 is no less than 1000 particles/μL, and the number of coarse particles with a diameter of no less than 5 μm contained in a mixed liquid of the liquid (a), the liquid (b) and the liquid (c) in a mass ratio of 1:1:1 is not larger than 1000 particles/μL.

10. An ink set for ink-jet printing according to claim 8, wherein the colorant in the liquid (a) is a pigment, and the pigment is at least one pigment selected from the group consisting of a pigment dispersed with a polymer dispersant, a self-dispersible pigment, and a pigment coated with a resin.

11. An ink set for ink-jet recording according to claim 8, wherein a mixed liquid of the liquid (a), the liquid (b) and the liquid (c) in a mass ratio of 1:1:1 has a conductivity of not larger than 5.0 S/m.

12. An ink set for ink-jet recording according to claim 8, wherein the liquid (b) or the liquid (c) contains a colorant.

13. An ink set for ink-jet recording according to claim 8, wherein the liquid (a) has a surface tension of no less than 15 mN/m and not larger than 60 mN/m, or the liquid (b) and the liquid (c) each have a surface tension of no less than 15 mN/m and not larger than 45 mN/m.

14. An ink set for ink-jet recording according to claim 8, wherein the liquid (a), the liquid (b) and the liquid (c) each have a viscosity of no less than 1.2 mPa·s and not larger than 8.0 mPa·s.

15. An ink-jet recording apparatus comprising a recording head for ejecting each liquid in an ink set for ink-jet recording,
the ink set for ink-jet recording comprising the liquid (a) containing the colorant, the water soluble solvent and water; the liquid (b) and the liquid (c) containing the pH adjusting agent, the water soluble solvent and water; wherein:
(i) the colorant is anionic;
(ii) the liquid (b) has a pH of not higher than 6.5;
(iii) the liquid (c) has a pH of not lower than 8.0; and
(iv) a mixed liquid of the liquid (b) and the liquid (c) in a mass ratio of 1:1 has a pH of not lower than 7,
wherein the colorant in the liquid (a) is a pigment, and the pigment is selected from the group consisting of a pigment dispersed with a polymer dispersant, a self-dispersible pigment, and a pigment coated with a resin.

16. An ink-jet recording apparatus according to claim 15 wherein the liquid (b) comprises a heterocyclic compound represented by the following general formula (I):

(I)

wherein X represents O, NH, NR, S or SO2; R represents an alkyl group; n represents an integer from 3 to 6; and m represents an integer from 0 to 7.

17. An ink-jet recording apparatus comprising:
a recording head for ejecting each liquid in an ink set for ink-jet recording, and
a maintenance unit,
the ink set for ink-jet recording comprising the liquid (a) containing the colorant, the water soluble solvent and water; the liquid (b) and the liquid (c) containing the pH adjusting agent, the water soluble solvent and water; wherein:
(i) the colorant is anionic;
(ii) the liquid (b) has a pH of not higher than 6.5;
(iii) the liquid (c) has a pH of not lower than 8.0; and
(iv) a mixed liquid of the liquid (b) and the liquid (c) in a mass ratio of 1:1 has a pH of not lower than 7, and
wherein at least the liquid (a), the liquid (b) and the liquid (c) are mixed in the maintenance unit.

18. An ink-jet recording apparatus according to claim 17, further comprising a maintenance mechanism for maintaining the pH in the maintenance unit at 5 to 9.

19. An ink-jet recording apparatus comprising a recording head for ejecting each liquid in an ink set for ink-jet recording,
the ink set for ink-jet recording comprising the liquid (a) containing the colorant, the water soluble solvent and water; the liquid (b) and the liquid (c) containing the pH adjusting agent, the water soluble solvent and water; wherein:
(i) the colorant is cationic;
(ii) the liquid (b) has a pH of not lower than 8.5;
(iii) the liquid (c) has a pH of not higher than 6.0; and
(iv) a mixed liquid of the liquid (b) and the liquid (c) in a mass ratio of 1:1 has a pH of not higher than 7.

20. An ink-jet recording apparatus according to claim 18, further comprising the ink-jet recording apparatus having a maintenance unit, wherein at lest the liquid (a), the liquid (b) and the liquid (c) are mixed in the maintenance unit.

21. An ink-jet recording apparatus according to claim 19, further comprising a maintenance mechanism for maintaining the pH in the maintenance unit at 5 to 9.

22. An ink-jet recording method for recording by ejecting each liquid in an ink set for ink-jet recording onto a recording medium,
the ink set for ink-jet recording comprising a liquid (a) containing the colorant, the water soluble solvent and water; the liquid (b) and the liquid (c) containing the pH adjusting agent, the water soluble solvent and water; wherein:
(i) the colorant is anionic;
(ii) the liquid (b) has a pH of not higher than 6.5;
(iii) the liquid (c) has a pH of not lower than 8.0; and
(iv) a mixed liquid of the liquid (b) and the liquid (c) in a mass ratio of 1:1 has a pH of not lower than 7,
wherein the colorant in the liquid (a) is a pigment, and the pigment is selected from the group consisting of a pigment dispersed with a polymer dispersant, a self-dispersible pigment, and a pigment coated with a resin.

23. An ink-jet recording method according to claim 22, wherein the liquid (b) comprises a heterocyclic compound represented by the following general formula (I):

(I)

wherein X represents O, NH, NR, S or SO2; R represents an alkyl group; n represents an integer from 3 to 6; and m represents an integer from 0 to 7.

24. An ink-jet recording method according to claim 22, wherein the liquid (c) is applied onto the recording medium after the liquid (a) and the liquid (b) are applied onto the recording medium, said liquid (a) and the liquid (b) contact to one another on the recording medium.

25. An ink-jet recording method for recording by ejecting each liquid in an ink set for ink-jet recording onto a recording medium,
the ink set for ink-jet recording comprising the liquid (a) containing the colorant, the water soluble solvent and water; the liquid (b) and the liquid (c) containing the pH adjusting agent, the water soluble solvent and water; wherein:
(i) the colorant is cationic;
(ii) the liquid (b) has a pH of not lower than 8.5;
(iii) the liquid (c) has a pH of not higher than 6.0; and
(iv) a mixed liquid of the liquid (b) and the liquid (c) in a mass ratio of 1:1 has a pH of not higher than 7.

26. An ink-jet recording method according to claim 25, wherein the liquid (c) is applied onto the recording medium after the liquid (a) and the liquid (b) are applied onto the recording medium, said liquid (a) and the liquid (b) contact to one another on the recording medium.

* * * * *